June 2, 1936. A. JOHNSON 2,042,998

OIL GASIFICATION PROCESS

Filed Jan. 16, 1932

Inventor
ALFRED JOHNSON

By Edmund G. Borden
Attorney

Patented June 2, 1936

2,042,998

UNITED STATES PATENT OFFICE 2,042,998

OIL GASIFICATION PROCESS

Alfred Johnson, West New Brighton, N. Y., assignor to Combustion Utilities Corporation, New York, N. Y., a corporation of Maine Application January 16, 1932, Serial No. 587,009

3 Claims. (Cl. 48—214)

This invention relates to oil gasification, and more particularly it concerns the gasification of fluid hydrocarbons such as oils, refinery gases, natural gas, and the like in a system comprising a gas generator provided with a bed or screen of sized refractory material in lieu of the usual bed of coke or like solid combustible material.

The present invention is an improvement over the invention set out in my copending application Serial No. 561,354, filed September 5, 1931, according to which carbon deposited upon a refractory generator screen during an oil gasification cycle is subsequently successively blasted upwardly and downwardly with air for the purpose of developing,—(by means alone of the combustion of this carbon in the refractory screen),—temperatures of 1800° F. or thereabove required for satisfactory oil gasification, employing a refractory screen such as hereinafter described.

In the practice of the invention described in my said copending application, using cold air for the up-and-down-stages of the blast cycle, under certain conditions difficulty is experienced in keeping the top portion of the refractory screen at or above the desired reaction temperature during the down blast period. This is sometimes observable when the hydrocarbon employed is such as to give only a small amount of carbon during the cracking thereof in the gas-making cycle. Furthermore at such times there appears to be an insufficient amount of sensible heat in the blast products leaving the bottom of the refractory screen during the down blast stage to maintain that portion of the screen at the high temperatures required in the subsequent gas-making cycle.

It has now been discovered that if the primary air employed in the blast cycle is preheated to or near the ignition temperature of the carbon that has been deposited in the top of the refractory generator screen during the previous gas-making cycle, this carbon will readily ignite and will very promptly burn from the surface of the refractory bodies and from the adjacent walls and top of the generator. In this manner the upper part of the generator and the refractory screen are brought to and maintained at the high temperature suitable for subsequent gas making. Any carbon deposited upon the generator walls is quickly burned therefrom at the high temperatures thus promptly attained, leaving the generator in excellent condition for the next gas-making run.

It has been further observed that the lower portion of the refractory screen is benefited in like manner by the use of preheated blast air in connection with an up-blast, whereby the reactivities of the air and carbon are greatly increased, while further advantage is taken of the sensible heat of the preheated air entering the generator. A much larger amount of fluid hydrocarbon such as fuel oil can be cracked on top of the refractory screen than is possible where oil is sprayed upon a coke bed,—in the latter of which cases a very dense bed of carbon quickly forms on top of the coke, and the coke bed is rapidly plugged up.

Among the more important objects of the present invention are:

To provide a process for the manufacture of a combustible gas from fluid hydrocarbons in which all of the heat requirements are met by the controlled combustion with preheated air or its equivalent of carbon produced by the cracking of the hydrocarbon; to provide in a process for the generation of a combustible gas from oil by heat developed alone from the carbon formed upon and within a refractory generator screen by the cracking of the said oil,—for the utilization of heat developed in the process for preheating air employed therein; and to provide for concurrently producing within a generator having a uniformly highly heated refractory screen, a highly-cracked combustible gas and a rich hydrocarbon-containing gas.

In its broadest scope, the invention includes the step of blasting either cold or preheated air or its equivalent through a bed or screen of selectively-sized refractory bodies within a gas generator under conditions adapted to consume at least a major portion of the carbon deposited in the screen during a previous gas-making run. Heat thus developed is retained in the refractory screen in amount sufficient to raise its temperature to 1800° F. or above, and preferably in the range 2200° to 3000° F. Additional heat thus produced is employed for heating the carbureter and superheater of a somewhat modified standard water gas set and, in certain instances, for heating a waste-heat regenerator in a gas offtake connecting the generator and the stack. The heat stored in the generator walls and in the upper part of the generator screen serves for vaporizing and gasifying hydrocarbons moving through the upper part of the generator but not through the screen; while the heat stored within the screen effects the high temperature cracking and conversion of hydrocarbon gases passing through it in controlled volume. The heat stored in the carbureter and superheater serves for fixing the hydrocarbons flowing from the generator,—either before or after admixture of the latter with the cracked gases flowing from the base of the generator.

The present invention is based in important part upon the discovery that the bringing of the refractory screen uniformly to the high temperatures required for gas-making,—as disclosed here and in my copending application Serial No. 561,354,—is greatly facilitated by the employment of preheated air in the down blast stage of the blast cycle, or in both that and the up blast stage of such cycle. The heat necessary for preheating the air conveniently may be regenerated from the blast gases of an earlier cycle.

In accordance with the preferred practice of the invention, the air in the process of being preheated serves to consume any carbon deposited in the carbureter during an earlier gas-making cycle and to create high temperatures within the carbureter suitable for subsequent proper functioning of the latter in the process. The preheated air then enters the generator with an oxygen content somewhat lower than that of pure air, but at a high temperature at which this oxygen quickly reacts with the carbon remaining in the refractory screen and on the generator walls. Furthermore, the sensible heat effectively assists in uniformly heating the said screen.

In the gas-making cycle of the process, the oil, or other fluid hydrocarbon introduced into the generator preferably is employed both for the manufacture of the base gas of the nature of a highly-cracked gas, and for producing the rich carburant with which the base gas is subsequently mixed, as hereinafter described.

In the accompanying drawing showing certain preferred forms of apparatus adapted for the practice of the process:

Figure 1:
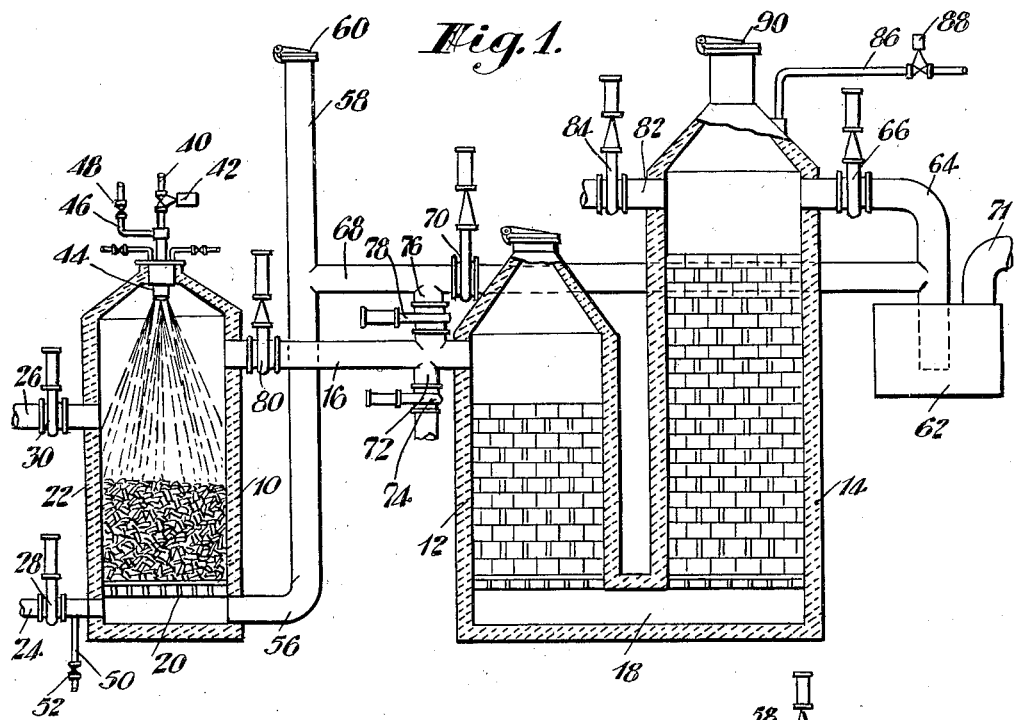
Fig. 1 is a vertical cross section through a water gas set.

Referring now to the drawing, numerals 10, 12 and 14 respectively designate a gas generator, carbureter and superheater, connected in series by means of the conduits 16 and 18. A grate 20 mounted somewhat above the base of the generator 10 supports thereon a bed or screen 22 of considerable depth of highly heat-resistant refractory material such as high alumina fire brick, pure alundum, high silica brick and the like, adapted to withstand temperatures of 3000° F. and above, and which preferably offers great resistance to spalling at temperatures above 1400° F.

Instead of the grate construction shown, there may be substituted a refractory bridge-wall construction or one of checkerbrick for supporting the refractory screen.

The refractory bodies are preferably sized to around 1¼" x 1¼" x 3", although sizes of ¾" x ¾" x ¾" and upward have proved satisfactory. The depth of the refractory screen varies from around 2 feet upwardly depending upon such conditions of operation as the temperature maintained in the screen, the available carbon in the hydrocarbon being gasified, and the like.

Blast air conduits 24 and 26 controlled by valves 28 and 30 open into the generator respectively below the grate 20 and above the top of the refractory screen 22.

A fluid hydrocarbon conduit 40 controlled by a valve 42 and provided with a spray nozzle 44 is mounted in the top of the generator. A steam line 46 controlled by valve 48 likewise opens into the top of the generator through nozzle 44, (although this steam line can enter the shell at any point above the refractory bed), while a steam line 50, controlled by valve 52 opens into the generator below the grate. A conduit 56 establishes communication between the base of the generator 10 and a waste gas stack 58 provided with a stack valve 60.

The superheater 14 is in communication with a wash box 62 through the conduit 64 controlled by a valve 66. A header 68, controlled by valve 70, establishes direct communication between the conduit 56 and the wash box. An air conduit 72, controlled by valve 74, may, if desired, be employed for introducing secondary air directly into the carbureter as shown. Controlled communication is established between the header 68 and conduit 16 by means of by-pass line 76 controlled by valve 78. In certain modifications of the invention a hot valve 80 is interposed in the conduit 16.

For introducing air into the superheater, there is provided an air conduit 82, controlled by valve 84; similarly for introducing steam into the superheater there is provided a steam line 86 controlled by valve 88. The superheater is provided with a stack valve 90 of well known type. The carbureter and superheater are provided with the usual checker-brick internal construction for facilitating heat regeneration during operation.

Figures 2, 3:
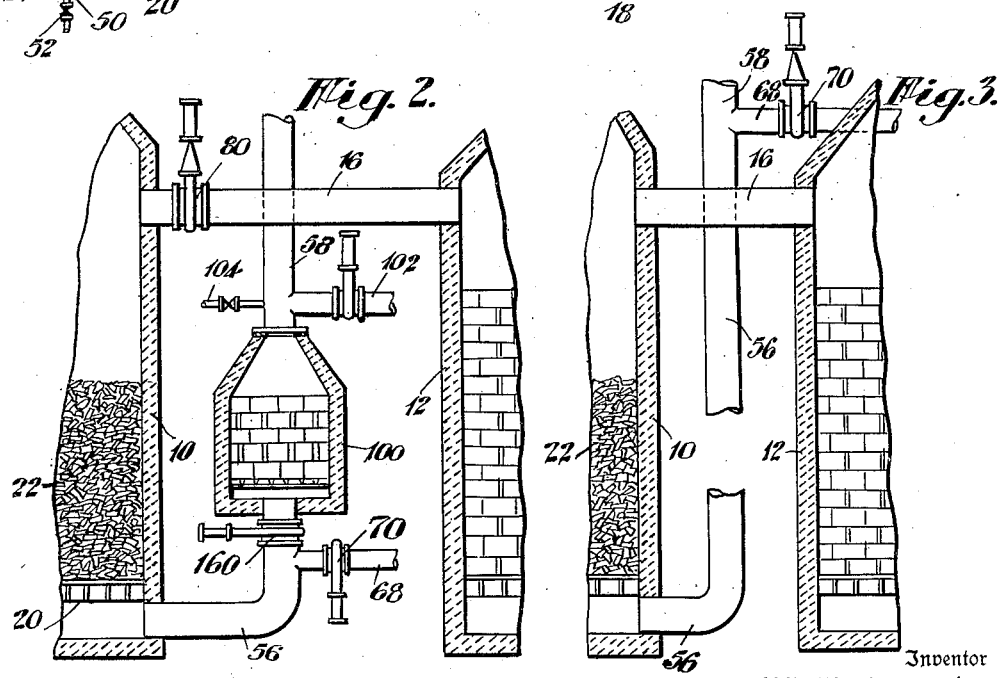
Fig. 2 is a fragmentary vertical section through a modified apparatus, showing a waste heat regenerator and portions of a generator and of a carbureter associated therewith.
Fig. 3 is a fragmentary vertical section through portions of the generator and carbureter, showing a modified piping construction.

According to the modification of the invention illustrated in Fig. 2, a heat regenerator 100 is interposed in the blast gas offtake line 56 beyond the point of junction therewith of the header 68. The valve-controlled air line 102 and valve-controlled steam line 104 lead into the upper part of the regenerator 100. The latter is provided with the usual internal checker-brick construction for heat regeneration purposes. Valve 160 is located in line 56 as shown.

In the preferred practice of the invention, employing the water gas set construction of Fig. 1, the following cycles are successively employed. Assuming that an oil-gas making cycle has been completed, and that the refractory screen 22 now contains a substantial amount of carbon deposited in and upon it,—air, or air more or less saturated with steam, is introduced into the base of the generator below the grate thru the line 24. In its passage upward through the refractory screen, the usual highly exothermic reaction occurs between it and the carbon deposited within the screen,—with the formation of a producer gas which, in highly-heated form, then flows successively through the carbureter and superheater, and thence, through valve 66 to the wash box and to storage.

As this stage of the blast cycle proceeds, the producer gas formed becomes progressively leaner, due to the smaller amounts of carbon in the refractory screen because of its gradual consumption. When the thermal capacity of the gas reaches a fixed minimum,—which may be in the neighborhood of 70 B. t. u. per cubic ft.,—valve 66 is closed, stack valve 90 is opened, and blasting is continued upwardly through the generator screen. Secondary air is now introduced into the generator above the refractory screen through the conduit 26. If desired, additional secondary air may be introduced into the carbureter through the conduit 72. In this manner selected portions of the potential heat of the producer gases are stored respectively in the upper part of the generator and refractory screen therein; and in the carbureter, to be utilized later.

When the air flowing upwardly through the grate 20 has consumed all or the major portion of the carbon originally deposited in the lower portion of the fuel bed, the air blast through line 24 is cut off, valves 90, 30, and 74 are closed, and a short steam purge of the set is made by steam introduced into the superheater through line 86. After flowing through the carbureter and generator, the steam exits through stack valve 60. Air, or air more or less admixed with steam is then introduced into the superheater through line 82 and flows therefrom through the carbureter 12 to the generator,—being highly preheated during such passage both by the absorption of sensible heat from the highly heated checker-brick of the carbureter and superheater and by the combustion of carbon deposited during a previous gas-making cycle.

The thus highly preheated air, the oxygen content of which has been somewhat reduced,—enters the generator and flows downwardly through the refractory screen 22; and thence the combustion gases flow through stack 58 to the atmosphere. The preheated air entering the upper part of the generator actively consumes the residual carbon remaining in the upper portion of the refractory screen and upon the generator walls thereby facilitating the development of high gas-making temperatures which are uniformly distributed through the refractory screen by the highly heated gases. The increased reactivity of the air at this stage due to the high preheat compensates for the partial consumption of the oxygen content thereof within the carbureter.

After the generator and the refractory screen therein have reached suitable gas-making temperatures, preferably above 2000° F., the air supply is cut off through line 82, and stack valve 60 is closed. The set is now purged of air by steam introduced into the superheater through line 86 and which flows successively through the superheater, carbureter, the upper part of the generator and thence through conduits 56 and 68 to the wash box.

After the system has been purged of air, and while the steam is flowing in the manner stated, oil or other hydrocarbon or a mixture of oil and other hydrocarbon, is introduced into the generator through the spray nozzle 44. The portion of the hydrocarbon line and nozzle within the generator is preferably jacketed for maintaining the oil at a suitable low temperature during the operation. The oil may be sprayed into the generator by means of or together with a hydrocarbon gas or vapor, or the oil and gas may be introduced independently through separate lines.

The hydrocarbons in the oil spray are quickly vaporized and partly cracked in the upper part of the generator and of the refractory screen. These hydrocarbons are caused to flow through the highly heated refractory screen where, due to the high temperatures existing therein, they are still further cracked and,—together with the gases formed by the reaction of the hydrocarbons with the steam concurrently flowing through the generator,—pass from the base of the generator through conduits 56 and 68 to the wash box.

As soon as the carbureter and superheater have been purged of air, the introduction of steam through line 86 may be discontinued and process steam then introduced through line 46 direct to the generator. The valve 80 in line 16 is opened somewhat to permit the exit from the upper part of the generator of a controlled amount of hydrocarbon vapors formed therein by the vaporization of the oil. Valve 70 in line 68 is closed and the valve in the bypass line 76 is opened. The main portion of the combustible gas and vapors formed in the generator now passes through the refractory screen and thence through conduits 56 and 76 into and through the carbureter and superheater, and thence through conduit 64 to the wash box and storage. These highly cracked gases entering the carbureter from the base of the generator are carburetted with the selected portion of rich vapors concurrently being withdrawn from the upper part of the generator through conduit 16. The purge steam flowing from 86 during the previous purging step cools the carbureter to a temperature satisfactory for carburetion purposes,—around 1500° F. The steam also reacts with carbon within the refractory screen thereby producing water gas; and so it can be used as a temperature control medium to reduce the temperature of the refractory screen to that required for producing a cracked gas of desired calorific value leaving the base of the generator during a subsequent gas-making cycle. This mixed gas is fixed in the carbureter and superheater and thence flows to the wash box.

After the temperature of the refractory generator screen has fallen below that suitable for efficient processing of the oil or other hydrocarbon being converted, the flows of oil and steam through the lines 40 and 46 are cut off and an up-purge with steam through the set is made, the steam being introduced through line 50 into the generator beneath the grate,—the resultant gases flowing through the carbureter and superheater to the wash-box. The blast cycle is then repeated. In the above-described practice of the invention the gas-making cycle is effected in a single stage between successive blast cycles.

In certain instances it may be desired to separate the gas-making cycle into two stages for the successive production in the set of gases of different characteristics which later may be mixed together in any desired proportions in a gas holder to yield a gas of desired properties, as hereinafter described. In such modification of the invention the blast cycle is the same as that previously described.

The gas-making cycle is carried out in the following manner:

The flow of steam into the system through line 86 is continued after the steam purge,—as a steam run cycle, the steam being superheated in the superheater and carbureter. The superheated steam flows downward through the generator together with the oil or hydrocarbon mixture sprayed therein thru line 40. The resultant combustible gas mixture then flows from the generator through conduits 56 and 68 direct to the wash-box,—the valve 78 being closed.

After this stage of the gas-making cycle has been continued for a suitable length of time, the flow of steam through line 86 is discontinued, the valve 70 is closed, and the valve 80 is partly opened. A limited amount of steam is then introduced into the base of the generator through conduit 50 and reacts with carbon in the refractory screen yielding some water gas. The current of the latter leaving the generator serves as a high temperature carrier for vaporized and partly cracked hydrocarbons entering the generator through line 40 and which are vaporized within the upper part of the generator above the refractory screen. This rich hydrocarbon-containing gas flowing from the generator is fixed in the carbureter and superheater and then flows to the wash box and to storage. It may be introduced into the gas holder that holds the gas produced during the first stage of the gas-making cycle; or it may be separately stored and subsequently blended as desired. The stored portion of the blast gases may likewise be used for blending.

In the event it is desired to practice the invention in accordance with the series of steps outlined in the first-described modification, while at the same time avoiding the use of the hot valves 78 and 80, the bypass line 76 is eliminated (see Fig. 3). Control of the relative amounts of the gases flowing to storage from the generator through the conduits 56 and 16 is then effected by suitable adjustment of the respective valves 66 and 70. Suitable suction for the purpose may be maintained on the wash box and lines 64 and 68 communicating therewith through the conduit 71 leading to the usual gas-scrubbing system and to storage. The regenerator of Fig. 2 then may be located in line 56 between the generator and the line 68.

In certain instances it is desirable to preheat the air employed in the up-blast stage as well as in the down-blast stage of the blast cycle. Fig. 2 shows a modified form of apparatus adapted for the use of preheated air in both blast stages,—the said air being preheated by heat regenerated in the process. The regenerator 100 is interposed in the line 56 leading to the stack from the generator. It retains sensible heat regenerated from the blast gases flowing to the stack. Thereafter, in the up-blast stage of the succeeding blast cycle, air is introduced into the regenerator 100 through the conduit 102 and, after being preheated therein, flows upwardly through the refractory generator screen in the manner described. In this modification, little or no cold air is introduced into the generator through the line 24.

It is within the scope of the invention to reverse the order of the down-blast and up-blast stages of the air-blasting cycle through the refractory generator screen so as to employ the down-blast stage first.

Any tendency toward cooling of the bottom of the refractory screen during the latter part of the up-blast stage, where cold air is employed, is effectively offset by the heat carried downwardly therethrough during the subsequent down-blast stage. All of the refractory screen is thereby made highly effective for the cracking of hydrocarbons and the subsequent collection of carbon.

Flexibility of control of the process is definitely facilitated by the employment of a refractory screen heated throughout to a controlled high gas-making temperature by the combustion of carbon contained thereon. The conditions of screen temperature, size of refractory bodies composing the screen, and the time of contact of the hydrocarbon with the refractory screen preferably is such that the screen catches and holds more carbon than is actually necessary for the heat requirements of the process.

The oil gas or mixed oil gas-water gas produced has a heating value which varies from around 400 B. t. u. per cubic foot to 1000 or more B. t. u. per cubic foot. The specific gravity of the gases ranges from around .25 to .70 according to the temperature maintained in the refractory screen, the rate of flow of the gases through the said screen and the composition of the oil or hydrocarbon mixture employed. Hydrocarbon oils of the gravity of fuel oil or even heavier hydrocarbons are well adapted for use in this process. Gas oil gives satisfactory service, although a somewhat heavier oil is preferred, such as one having an A. P. I. gravity of 12° to 18°. Mixtures of oil with gaseous hydrocarbons such as refinery cracking still gases may be used.

For purposes of illustration only, and not to be regarded as limiting in any manner the scope of the invention, it is submitted that in the practice of the invention approximately 40% of the primary air has been effectively employed in the down-blast stage. Likewise approximately 40% of the total secondary air has been employed satisfactorily in the down blast. If desired, the rate of flow of air through the screen in the down blast may be higher than that in the up blast. Rate ratios as high as 3:1 have been used.

The process steam when used generally amounts to from .2 to .6 pound or more per pound of generator oil,—depending upon the generator temperatures and upon the grade of oil or hydrocarbon mixture,—the lighter oils requiring less process steam.

By the term "refractory screen" as used in the specification and claims is meant a filtering screen of heat-resistant refractory bodies of such size and shape and in such depth as to retain the carbon formed by hydrocarbon decomposition in sufficient amount to yield, by subsequent combustion, at least enough heat to supply the heat requirements for cracking the hydrocarbon oil in a subsequent gas-making cycle.

The practice of the present invention makes it possible for an operator to produce from a hydrocarbon mixture, a combustible gas of preselected heating value and specific gravity within a rather wide range of values, utilizing for the purpose a process adapted to uniformly heat and to maintain temperature control within a refractory generator screen, a carbureter and superheater.

The invention is susceptible of modification within the scope of the appended claims:

I claim:

1. In a cyclic process for making combustible gas wherein during a gas-making period hydrocarbons are cracked by passing the same through a carbon filtering bed of highly heated ceramic pieces, with resultant deposition of carbon on the surfaces of the ceramic, which carbon is burned during a subsequent air blast period, the steps of blasting air upwardly through the ceramic bed in amount approximately sufficient to consume the carbon deposited in the lowermost half of the bed during the preceding make period, burning blast gases thus produced, regenerating heat thus developed, and utilizing part of the heat to preheat a back blast of air which is then passed downwardly through the refractory bed in amount approximately sufficient to consume the carbon remaining in the bed immediately following the upward air blast.

2. In a cyclic process for making combustible gas wherein during a gas making period hydrocarbons are cracked by passing the same through a carbon filtering bed of highly heated ceramic pieces, with resultant depositon of carbon on the surfaces of the ceramic, which carbon is burned during a subsequent air blast period and heat thus produced is regenerated, the steps of utilizing part of said regenerated heat to preheat blast air between make periods, passing the thus preheated air vertically through the ceramic bed and developing the heat necessary for carrying out a subsequent gas-making period in the ceramic bed by blasting air in one direction through the bed in amount sufficient to consume the carbon in the zone of the bed first contacted by the air, and by successively blasting air in the opposite direction through the bed in amount sufficient to consume at least the major portion of the carbon remaining therein.

3. In a cyclic process for making combustible gas wherein during the gas make period hydrocarbons are cracked, and carbon produced during cracking is separated from the gas by passing the latter through a carbon filtering bed of highly heated refractory pieces, with resultant deposition of carbon on the surface of the refractory, which carbon is burned during a subsequent blast period, the steps of blasting preheated combustion supporting gas vertically and successively in one direction through the refractory bed and then in the opposite direction through the bed between make periods, adjusting the amount of combustion supporting gas passed through the bed substantially in accordance with the amount of carbon held thereby, burning a portion of the blast gases thus produced, storing the heat thus developed, and utilizing heat thus stored to preheat the combustion-supporting gas passed through the bed during a subsequent blast period.

ALFRED JOHNSON.